(12) United States Patent
Ascher et al.

(10) Patent No.: US 8,186,204 B2
(45) Date of Patent: May 29, 2012

(54) METHOD AND DEVICE FOR DYNAMICALLY DETERMINING A SEGMENT FOR AN ANGULAR SPREAD, INSIDE WHICH FUEL IS INJECTED INTO AN INTERNAL COMBUSTION ENGINE

(75) Inventors: Stefan Ascher, Strasskirchen (DE);
Hans-Jörg Wiehoff, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 159 days.

(21) Appl. No.: 12/669,053

(22) PCT Filed: Jul. 16, 2008

(86) PCT No.: PCT/EP2008/005809
§ 371 (c)(1),
(2), (4) Date: Apr. 19, 2010

(87) PCT Pub. No.: WO2009/010280
PCT Pub. Date: Jan. 22, 2009

(65) Prior Publication Data
US 2010/0223985 A1  Sep. 9, 2010

(30) Foreign Application Priority Data
Jul. 16, 2007 (DE) .................. 10 2007 033 045

(51) Int. Cl.
*G01M 15/04* (2006.01)
(52) U.S. Cl. .................................................. 73/114.49
(58) Field of Classification Search .............. 73/114.49
See application file for complete search history.

(56) References Cited

U.S. PATENT DOCUMENTS

| | | | | |
|---|---|---|---|---|
| 4,998,522 A | * | 3/1991 | Achleitner | 123/491 |
| 5,245,972 A | * | 9/1993 | Denz et al. | 123/478 |
| 6,230,687 B1 | * | 5/2001 | Marca | 123/491 |
| 6,334,428 B1 | | 1/2002 | Nagatani et al. | 123/305 |
| 6,868,833 B2 | * | 3/2005 | Friedrich et al. | 123/479 |
| 6,918,371 B2 | * | 7/2005 | Shimazaki | 123/305 |
| 7,027,907 B2 | * | 4/2006 | Le Gall et al. | 701/105 |
| 7,263,976 B2 | | 9/2007 | Wenzler et al. | 123/478 |
| 2003/0196643 A1 | * | 10/2003 | Friedrich et al. | 123/479 |

FOREIGN PATENT DOCUMENTS

DE   3923479   1/1991
(Continued)

OTHER PUBLICATIONS

German Office Action for Application No. 10 2007 033 045.8 (4 pages), Oct. 22, 2007.

(Continued)

*Primary Examiner* — Freddie Kirkland, III
(74) *Attorney, Agent, or Firm* — King & Spalding L.L.P.

(57) ABSTRACT

In a method and a device for dynamically determining a segment for an angular spread, fuel is injected into an internal combustion engine and the useful injection range (IRu) and/or the relative position of the segment comprising the angular spread, in which a fuel injection can be carried out especially during a multiple injection, are variable. A corresponding adaptation of the useful injection range (IRu) can advantageously trigger a subsequent injection impulse, as required, for example, for a regeneration module of a diesel particle filter. The adaptation is carried out according to an operating parameter, for example according to the rotational speed gradient.

23 Claims, 4 Drawing Sheets

FOREIGN PATENT DOCUMENTS

| | | |
|---|---|---|
| DE | 10019464 | 11/2000 |
| DE | 10104252 | 8/2002 |
| DE | 10215629 | 10/2003 |
| DE | 102004014369 | 10/2005 |
| DE | 102005003273 | 7/2006 |
| DE | 10152903 | 3/2007 |
| DE | 102006001368 | 7/2007 |
| DE | 102006001368 A1 * | 7/2007 |
| DE | 102006004281 | 8/2007 |

OTHER PUBLICATIONS

International Search Report for Application No. PCT/EP2008/005809 (7 pages), Apr. 14, 2009.

* cited by examiner

METHOD AND DEVICE FOR DYNAMICALLY DETERMINING A SEGMENT FOR AN ANGULAR SPREAD, INSIDE WHICH FUEL IS INJECTED INTO AN INTERNAL COMBUSTION ENGINE

CROSS-REFERENCE TO RELATED APPLICATIONS

This application is a U.S. National Stage Application of International Application No. PCT/EP2008/005809 filed Jul. 16, 2008, which designates the United States of America, and claims priority to German Application No. 10 2007 033 045.8 filed Jul. 16, 2007, the contents of which are hereby incorporated by reference in their entirety.

TECHNICAL FIELD

The invention relates to a method and a device for dynamically determining a segment for the angular spread within which a fuel injection can be carried out into an internal combustion engine.

BACKGROUND

It is generally known that an internal combustion engine is controlled and monitored with an engine control device (control device). The internal combustion engine is equipped for this purpose with an injection system, for example with a common rail or a pump-nozzle injection system. In order to inject fuel into the various cylinders of the internal combustion engine, a fuel injector is arranged on each individual cylinder. Piezo-electric injectors are usually used, in particular, also to be able to carry out a multiple-injection with pre-injections and post-injections, since this type of injector not only permits rapid switching times, thereby allowing very small injection quantities to be controlled, but also has sensory properties which can be used for controlling positions.

Furthermore, it is known that in engines, in particular with a relatively large number of cylinders, a plurality of cylinders are combined to form one bank. Depending on the bank system, the control device can actuate a different number of injectors simultaneously. For example, in a single-bank system one fuel injector is actuated and in a two-bank system two fuel injectors are actuated simultaneously. The actuation is carried out by means of correspondingly embodied electric output stages which are arranged in the control device. The output stages generate voltage pulses/current pulses for the injectors, which voltage/current pulses are converted into a mechanical movement in the injectors and in the process they open or close to a greater or lesser degree the corresponding injection valve in order to inject fuel into a cylinder of the internal combustion engine.

Furthermore it is known that for one injection cycle of a cylinder a plurality of consecutive injection pulses are generated successively and the injection pulses are carried out with the same clock cycle.

For physical reasons, a fuel injection can be injected only within one specific rotational angle of the crankshaft of the internal combustion engine. The resulting angular spread for an injection is also referred to as a segment. Depending on the number of cylinders of the bank system used, different segments for the fuel injection arise given uniform distribution. A segment S is usually calculated according to the following formula:

$$S[°\ CA] = 720[°\ CA] / \text{number of cylinders} \times \text{number of banks.}$$

Since the segments follow one another in terms of timing, the control device can only actuate the segments sequentially. This means that in known injection systems the segments are constant and cannot be changed. This has the disadvantage that an injection pulse which would lie outside the predefined segment cannot be carried out. In particular, for example, during the regeneration of a particle filter of a diesel engine, it is not possible for very retarded post-injections to be carried out outside the segment. However, this may be necessary in order to heat the particle filter by means of injected, unburnt fuel for the post-injection. Furthermore, such a post-injection should not lead to an increase in torque. It has not been possible to solve this problem hitherto in the known prior art.

The document DE 10 2006 004 281 A1, which was published after the priority date of the document in question here, describes a device and a method for controlling the metering of fuel into an internal combustion engine. In this context, in the case of a first angular position of a crankshaft or camshaft first variables are calculated in order to control at least a first partial injection, and in the case of a second angular position at least a second variable is calculated in order to control a second partial injection. Furthermore, a limiting value is predefined and the at least one second variable is limited to this limiting value.

Document DE 39 23 479 A1 discloses a method for carrying out sequential injection processes, in which, when predefined injection angles are reached, crankshaft incremental signals are generated and these incremental signals are counted in relation to a reference signal. As soon as a predefined injection angle is reached, the assigned injection process is carried out. With the described method it is possible to define the start of injection angle and end of injection angle precisely. The start of injection angle can be read out from a characteristic diagram as a function of the rotational speed and injection period.

Document DE 101 52 903 B4 describes a method for calculating injection time periods for an internal combustion engine which can be operated in a homogenous mode at certain times and in a stratified mode at certain times, wherein in the stratified mode the injection time period is calculated repeatedly for each cylinder per working cycle (720° CA) of the internal combustion engine, and wherein in the homogenous mode the injection time period for each cylinder is calculated only once per working cycle of the internal combustion engine.

Document DE 101 04 252 C1 describes a method for controlling an internal combustion engine according to which an action which has to be triggered earlier by a defined time period is to be carried out at a defined crankshaft angle. The time of the defined crankshaft angle is extrapolated as a function of the current crankshaft angle and the defined time period. The action is triggered if the extrapolated defined time differs from the current time by the defined time period.

Document DE 10 2004 014 369 A1 proposes a method for controlling an internal combustion engine. An ignition of a spark plug and an injection of fuel are intended to occur at certain crankshaft angles. This action has to be started with a sufficient lead time. The starting times are calculated taking into account the lead time.

SUMMARY

According to various embodiments, a method and/or a device can be specified with which the fuel injection into a cylinder of an internal combustion engine is improved. According to an embodiment, a method for dynamically determining a usable injection range within a segment in which fuel can be injected into a cylinder of an internal combustion engine, wherein the segment is a crankshaft angular segment, wherein the segment is determined as a function of the number of cylinders of the internal combustion engine and from the number of banks, and wherein a plurality of cylinders into which the fuel is sequentially injected are preferably assigned to one bank, may comprise the steps of—determining a possible injection range for the segment,—arranging a usable injection range within which a fuel injection can be activated within the possible injection range,—furthermore, determining an angular spread for a setup angle within the possible injection range,—making the possible injection range and/or the setup angle variable with respect to the relative position in relation to the crankshaft angle, and—determining the usable injection range as a function of at least one operating parameter of the internal combustion engine.

According to a further embodiment, the setup angle can be determined from the rotational speed of the engine and a setup time, wherein the setup time is at least the time period which a control device requires, in the case of a multiple-injection, to evaluate the last injection sequence from a preceding segment. According to a further embodiment, the setup angle can be determined as a function of a rotational speed gradient. According to a further embodiment, a latency time can be determined for the determination of the setup angle, wherein the latency time is the time period which is required for the determination of an individual injection sequence up to the complete execution thereof. According to a further embodiment, a rotational speed gradient which corresponds to the worst case can be used for the determination of the latency time. According to a further embodiment, the current rotational speed and/or the rotational speed gradient can be used to determine the setup angle in the worst case. According to a further embodiment, in the case of an incorrectly determined setup angle or if the control device is still within the setup time, a control pulse for the injection can be shifted to the end of the setup time if the control pulse was too early. According to a further embodiment, the shifting of the usable injection range can be varied as a function of the capacity utilization factor of the control device. According to a further embodiment, in the regeneration cycle for a diesel particle filter, the usable injection range can be shifted to such an extent that a retarded post-injection can be carried out. According to a further embodiment, the shifting of the injection range can be carried out in a ramp shape at the transition from the normal mode into a regeneration mode, and vice versa, wherein the torque neutrality at the steady-state working point is taken into account as a criterion.

According to another embodiment, a device for a method as described above, may have a control device of an injection system of an internal combustion engine, wherein the control device is designed, for example, for a single-bank system of a four-cylinder diesel engine, and having a crankshaft angular segment within which a fuel injection into the individual cylinders can be carried out, wherein the control device has a program with an algorithm, and the algorithm is designed to define a usable injection range for the fuel injection, and wherein the usable injection range can be determined, in terms of its angular spread and/or its relative position, at least as a function of the rotational speed gradient.

BRIEF DESCRIPTION OF THE DRAWINGS

An exemplary embodiment is illustrated in the schematic drawing and will be explained in more detail in the following description in which.

DETAILED DESCRIPTION

In the method or device according to various embodiments for dynamically determining a usable injection range within a segment in which fuel can be injected into a cylinder of an internal combustion engine, the characterizing features provide the advantage that the usable injection range of the segment can be adapted in an optimum way in relation to its setup angle and/or its relative position in relation to the rotational angle of the crankshaft as a function of at least one operating parameter of the internal combustion engine. This is necessary, in particular, if an individual injection pulse has to be actuated, for example, for a retarded post-injection which is not intended to bring about an increase in the torque. This is necessary, for example for a particle filter which has to be cleaned in a regeneration mode. Such a regeneration mode is necessary for maintaining the function of the particle filter in specific time intervals or depending on the degree of filling and definitely has to be carried out without the current engine control function being adversely affected in the process.

It is considered particularly advantageous that the setup angle can be determined very easily from the setup time and the rotational speed of the engine. In this context, the time period which a control device requires to be able to evaluate the last injection sequence from a previous segment in particular during a multiple-injection is assumed to be the setup time. The setup angle changes continuously since, on the one hand, the rotational speed of the engine is variable and, on the other hand, the setup time depends on the degree to which the capacity of the control device is utilized. The angular spread of the segment can therefore very easily be adapted to the current operating conditions of the internal combustion engine.

Another significant aspect also consists in the fact that the setup angle is determined for the dynamic case of operation of the engine. It has proven particularly advantageous that the setup angle is calculated as a function of the rotational speed gradient. The setup angle has a strong dependence on the rotational speed. Since the time period from the calculation of a segment x up to the finished execution of the segment x is relatively long, large rotational speed gradients can give rise to a correspondingly changed setup angle.

A further advantage can be seen in that a latency time is taken into account. The latency time is the time period which is required for the determination of an individual injection sequence up to the complete execution thereof. For safety reasons there is provision for the maximum possible rotational speed gradient to be used as the basis for the determination of the latency time in the worst case.

According to various embodiments, there is also provision that the current rotational speed and/or the rotational speed gradient are used to determine the setup angle in the worst case. The current rotational speed is present if the calculation of the setup angle is already concluded. This provides the advantage that the setup angle is not determined for the rotational speed which is present at the calculation time, since the setup angle is already increased due, for example, to an increase in the rotational speed which has taken place in the meantime. This approach results once more in a reduction in the injection range. This has the advantage that it is possible to ensure that the injection pulses are implemented correctly in relation to the angular spread only in this dynamic case.

During the dynamic determination of the segment it also appears advantageous that a control pulse is shifted if the setup angle has not been determined correctly or if the control device is still within the setup time. The control pulse is then shifted by the time period until the control device has finished the setup.

In a further embodiment, there is also provision that not only the absolute angular spread of the usable injection range of the segment is determined but also its relative position. In one embodiment there is therefore provision for the usable injection range to be capable of being shifted as a function of the capacity utilization factor of the control device. The usable injection range is shifted to a greater degree the higher the capacity utilization factor of the control device. This advantageously avoids a situation in which, for example, a late injection pulse cannot be executed because it would lie outside the usable injection range.

There is provision for the usable injection range to be shifted if, for example, a retarded post-injection is to be carried out in the regeneration cycle for a diesel particle filter. In this case, the retarded post-injection is to be used to burn off the particle filter in the regeneration cycle so that it can maintain its full function in terms of the filtering of soot particles.

A further advantageous aspect may be also that the transition from the normal mode into the regeneration mode, and vice versa, is carried out in a ramp shape. There is provision here for the ramps to be embodied in such a way that a torque neutrality occurs at the steady-state working point.

The various embodiments essentially relate to the dynamic determination of a usable injection range IRu of a segment S which is, in particular, optimized to the effect that, for example, a retarded post-injection can be carried out for the regeneration of a particle filter in a diesel engine without affecting the behavior of the engine. A further significant aspect can be seen in that the usable injection range IRu of the segment S can be shifted in its relative position in relation to the crankshaft angle in the retarded direction or conversely in the early direction according to requirements. The determination of the usable injection range IRu in relation to the angular spread and its relative position is carried out below on the basis of latency times and rotational speed gradients. As a result, a control device can precisely calculate the maximum possible injection range IRu for each rotational speed n by means of a program which is designed for the stored algorithm, or can obtain said maximum possible injection range IRu from a table. It is therefore possible to use the usable injection range IRu in an optimum way in accordance with the predefined number of banks without the fixed segment having to be shifted. The measures according to various embodiments increase the flexibility and variability of the control device or injection system used.

The application example described below for the dynamic determination of the usable injection range IRu is implemented by way of example for the regeneration mode of a particle filter, which regeneration mode is used in a pump-nozzle injection system or in a common-rail injection system. In this case, a retarded post-injection is carried out in order to feed sufficient unburnt fuel into the particle filter together with the exhaust gases. Combustion of the residues is then effected there by consumption of the fuel. For this case, the method according to various embodiments is to be used both to determine a way of optimizing the angular spread of the usable injection range IRu and to determine the relative position thereof.

The various embodiments relate not only to this specific special case but can also be used in an analogous fashion for other injection pulses.

Furthermore, no rigid assignment of the usable injection range IRu is made in relation to the top dead center, which is usually used as the basis for the start of the segment in the known prior art, since the position of the injection window can be shifted according to demands.

The figures explained below relate to a control device which is embodied with a single-bank system for a four-cylinder engine. For this control device, each segment S has, in accordance with the formula mentioned at the beginning, an injection range or a setup angle of 180° per cylinder. During the setup time, diagnosis of the last injection sequence is carried out and transmitted as a new injection sequence. The setup time is essentially defined by means of the transmission rate of the data bus used, for example an SPI (serial processor interface) bus. For example, a setup time of at least 1280 µs is determined for the output stage of a control device which cooperates with a pump-nozzle injection system. This means that after the last injection pulse at a segment x the system has to wait at least for the specified setup time before the first injection pulse for the new segment x+1 can be triggered electrically. If the setup time is not complied with, the first injection pulse for the segment x+1 is shifted in an undefined way.

The specified setup time is not fixed since it is configured according to the current capacity utilization factor of the control device or of the communication bus (SPI). Furthermore, a setup angle SA is dependent on the rotational speed or a rotational speed gradient dn/dt in the worst case, as will be explained in more detail later with respect to FIG. 3.

The setup angle for a segment x can be determined from the rotational angle of the crankshaft as a function of the current rotational speed n and the current setup time and obtained, for example, from a stored table.

Figure 1:
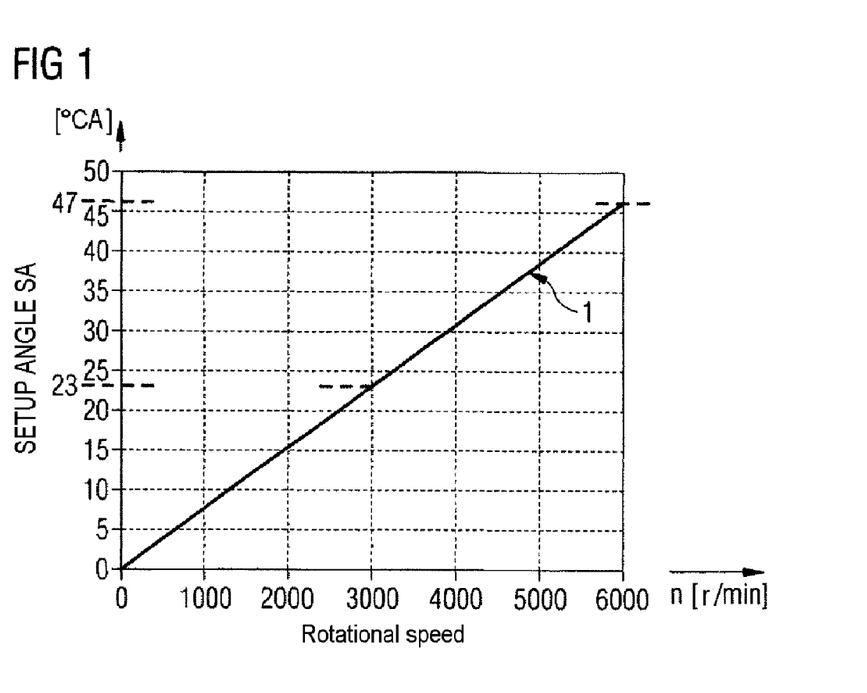
FIG. 1 shows a first diagram in which the setup angle is plotted against the rotational speed of the internal combustion engine.

A curve 1 in the diagram in FIG. 1 shows the relationship between the setup angle SA (plotted on the Y axis) and the rotational speed n (plotted on the X axis) of a crankshaft of an internal combustion engine. The curve 1 is based on a control device which is designed for a single-bank system of a four-cylinder engine, as has already been mentioned. The curve 1 represents a straight line in which a corresponding setup angle SA from 0 to approximately 47° (crankshaft angle) can be determined for a rotational speed n of 0 to 6000. For example, given a rotational speed n=3000 the setup angle SA is a crankshaft angle of 23°. Consequently, when considered in static terms a corresponding setup angle SA can be read off as a crankshaft angle for every other rotational speed n. The diagram is stored, for example, in a memory of the control device, as will also be explained in more detail later.

Figure 2:
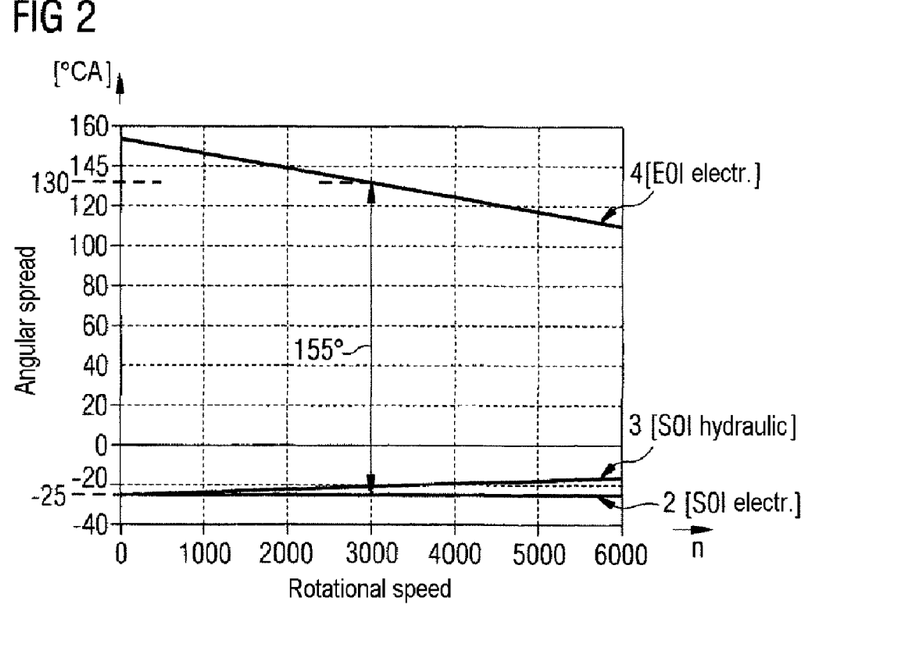
FIG. 2 shows a second diagram in which three angular functions are plotted as a function of the rotational speed.

FIG. 2 shows a further diagram with the curves 2 to 4 with which a possible injection range IRp and a usable injection range IRu can be determined. The crankshaft angle ° CA is plotted on the Y axis, and the rotational speed n is plotted on the X axis. The curves 2 to 4 are plotted in the diagram.

The curve 4 gives the end of injection EOI (end of injection in ° CA) as a function of the rotational speed n. It is apparent that as the rotational speed n increases the end of injection EOI decreases in the direction of smaller crankshaft angle CA. The curve 4 corresponds to the electrically determined values. However, in practice the values become worse once more, since, for example in the case of a pump-nozzle injector for a pilot injection, a pre-stroke of 80 microseconds and an actuation period of 270 microseconds are required.

The curve 2 shows the start of the earliest injection SOI (start of injection) as a function of the rotational speed n. The curve 2 also corresponds to the electrical values.

The hydraulic start of feeding is shifted once more, specifically by the time which is required for the pre-stroke and the closing of the injector. If these times are taken into account, the curve 3 is obtained for the start of the injection. The curve 3 therefore once more reduces the value for the usable injection angle or the usable injection range IRu.

In order to understand the various embodiments better, the determination of the usable injection range IRu will now be calculated using a numerical example. It is assumed that a retarded post-injection with an electrical end of injection EOI=155° is to take place after the top dead center. EOI is referred to as the end of the injection of the current segment. It is assumed that the current rotational speed n of the engine=3000 and a steady-state approach is to take place. The injection signals are measured from the top dead center of the crankshaft in the direction of rotation. Since each segment x for the assumed four-cylinder single-bank system has a fixed angular spread of 180° without interleaving, this results in a start of the earliest injection time SOI (start of injection) of SOI=155°−180°=−25° for the following segment x+1 given the assumed rotational speed n=3000. The minus sign means that the earliest start of injection 25° CA is before the top dead center. The next segment x+1 is then shifted by this angle by means of the dynamic segment shifting according to various embodiments to the effect that the retarded injection pulse EOI=155° can be used. However, this involves the loss of an injection angle for early pre-injections, since the absolute injection window cannot be made larger, as will be explained below. It is to be noted that interleaving provides the possibility of allowing the segments to interleave, which ensures that the injection pulse for one cylinder does not occur at the same time as the injection pulse for another cylinder. In this context, one bank, i.e. a single output stage, is sufficient for a four-cylinder engine.

Referring to FIG. 2, in accordance with the curve 2 the start of injection SOI for the earliest injection of the next segment x+1 is read off below as −25° CA when n=3000. The end of injection EOI in accordance with the curve 4 and N=3000 is at a crankshaft angle of 130° CA. The desired usable injection range IRu of 155° CA is obtained therefrom electrically.

Curve 3 indicates the segment distribution of the individual cylinders (only 3 here) plotted against the crankshaft angle which corresponds to the hydraulic start of injection. As a result of the activation of the actuator and the pressure buildup or mechanical delays due to the pre-stroke and closing times of the injector, there is a further reduction in the usable injection range IRu. In the case of a directly driven injector, the delay is decreased as far as zero. The curve 3 (SOI hydraulic) has a crankshaft angle of −20° CA at n=3000. The usable injection range IRu therefore decreases to 150° CA.

Figure 3:
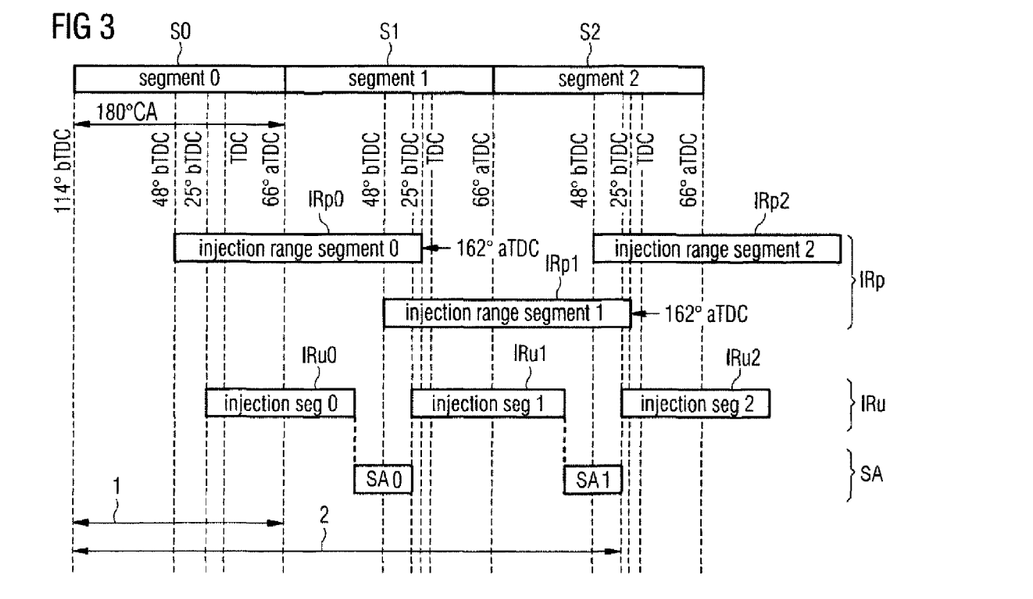
FIG. 3 shows a third diagram in which the timing of the processing of three segments 0 to 2 is illustrated.

FIG. 3 shows by way of example for the segments S0, S1 and S2 a sequence of the crankshaft angle with an initially static approach, in which a possible injection range IRp, a usable injection range IRu, an injection angle (see FIG. 2) and an injection quantity for the segment S1 are calculated. In the dynamic approach, the magnitude and the relative position or the shifting of the usable injection range IRu are determined.

In principle, the individual segments are processed sequentially, as is the execution. This means that during the processing of the segment S0 (see double arrow denoted by 1), the control device already calculates the injection range, the injection angle and the injection quantity for the segment S1 and subsequently processes them (see double arrow denoted by 2).

As can be seen further in FIG. 3, the segments S with the characteristic numbers 0, 1 and 2 are arranged in a sequential row one next to the other. The segments S are fixed at 180° CA owing to the predefined bank arrangement.

It is assumed that the segment S0 starts at a crankshaft angle of 114° bTDC (before top dead center). Since the theoretical segment length is 180° CA, the segment S0 ends at 66° aTDC (after top dead center). The segments S1 and S2 also analogously have an angular spread of 180° CA.

It is also assumed that in the given example a first pre-injection starts at an angle of 48° bTDC and the injection ends at 162° aTDC within the segment S1. This angular spread is referred to as a possible injection range IRp0 or IRp1, IRp2 for the segments S1, S2. However, since the calculation times and transit times on the communication bus give rise, like the mechanical switching times of the injector, to a delay, the usable injection range IRu0 for the segment S0 starts at 25° bTDC for a rotational speed n of the engine=3000, as has already been explained with respect to FIG. 1. The end of the usable injection range IRu0 is followed by the setup angle SA 1, as has been previously explained. The entire injection cycle for the segment 0 is then finished within the segment 1, at the latest at the angle 25° bTDC. The same applies to IRu1 and IRu2.

Figure 4:
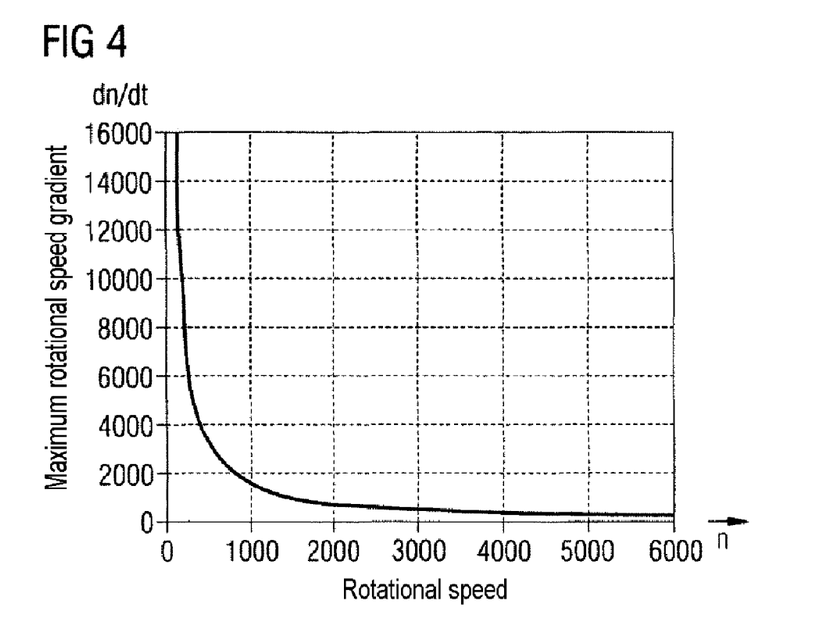
FIG. 4 shows a fourth diagram in which the maximum rotational speed gradient is illustrated as a function of the rotational speed, FIGS. 5a, b show two diagrams in which the profile of the static or dynamic setup angle or the influence on the injection range is illustrated, FIGS. 6a, b show two further diagrams.

It has already been explained that the setup angle SA is a function of time. A change in the rotational speed, and therefore a change in the setup time, may occur between the calculation of the usable injection range IRu and the actual execution. In the dynamic approach, the rotational speed gradient dn/dt is therefore taken into account for the worst case. For example, the maximum possible rotational speed gradient dn/dt can rise, due to undesired shifting of the transmission, from a low rotational speed range to a high rotational speed range and assume values up to 20 000 revolutions/min. The dependence of the maximum rotational speed gradient dn/dt with respect to the rotational speed n will be explained later with respect to FIG. 4.

The calculation of the injection window for the segment S1 already starts, in accordance with the interval 2 (see double arrow with numeral 2), at 114° bTDC in the segment S0 and ends, including the execution in the segment S2, at an angle of 25° bTDC. The usable injection range IRu1 of the segment 1 starts after the end of the setup angle SA0 of the segment S0 at 25° bTDC. After the usable injection range IRu1 ends, the new setup angle SA1 for the segment S1 follows and ends at 25° bTDC in the segment S2. This process is repeated analogously for the segment S2 with the possible injection range IRp2 or the usable injection range IRu2.

Depending on requirements, the usable range IRu0, IRu1 or IRu2 can then be shifted in the retarded direction given a retarded post-injection, or conversely in the early direction, without the segment S0, S1 or S2 being changed.

The setup angle SA is very strongly dependent on the maximum gradient of the change in rotational speed. The relationship between the rotational speed gradient and the rotational speed of the internal combustion engine is illustrated in the diagram in FIG. 4. The maximum rotational speed gradient dn/dt is plotted on the Y axis, and the rotational speed n is plotted on the X axis. The falling curve shows the direct relationship between the rotational speed gradient dn/dt and the rotational speed n. It is clear from the exponentially falling curve that as the rotational speed n increases, i.e. as the engine accelerates, the maximum rotational speed gradient dn/dt decreases.

Figure 5A:
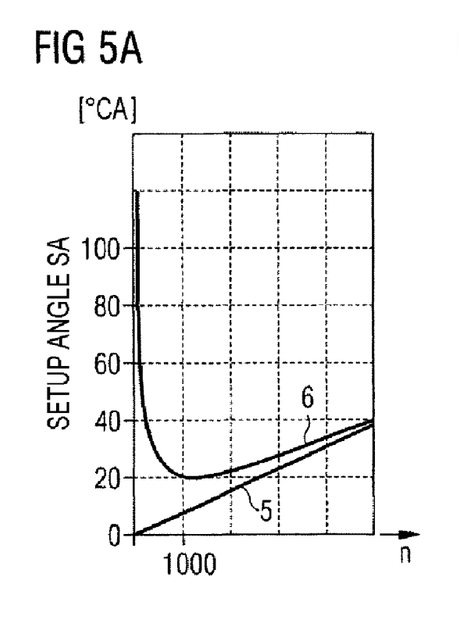
Figure 5B:
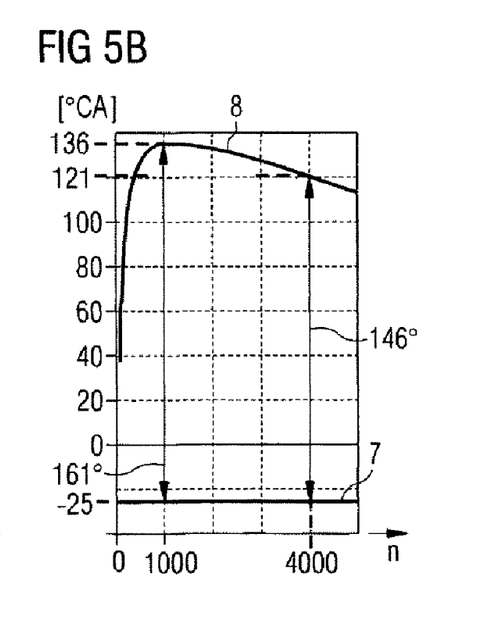

The two diagrams in FIGS. 5a, b illustrate a comparison between the steady-state behavior and the dynamic behavior. FIG. 5a illustrates the profile of the setup angle SA plotted against the rotational speed n with respect to the crankshaft angle CA. The curve 5 shows the profile in the steady-state approach of the setup angle SA and the curve 6 shows the dynamic profile of the setup angle SA. It is apparent that, in particular at relatively low rotational speeds n, the profile of the setup angle of the curve 6 behaves entirely differently than in the case of the curve 5.

In the diagram in FIG. 5b, the respective usable injection range IRu is represented with the steady-state approach and with the dynamic approach. The curve 7 shows the profile of the start of the injection (SOI) at a fixed crankshaft angle of −25° with the steady-state approach. The start of the injection is constant. The minus sign before the value of the angle indicates that the start of injection is before the top dead center of the crankshaft. The curve 8 shows the dynamic approach of the end of injection (EOI). The difference between the two curves shows the electrically determined usable injection range IRu in ° CA. While the curve 7 is a straight line, the profile of the curve 8 initially changes from low values rising and then falling again. Low rotational speeds below approximately 700 revolutions/min are insignificant since the minimum rotational speed in the idling mode of an internal combustion engine usually starts from 700 revolutions. A maximum injection angle occurs at approximately n=1000. Here, the injection angle −25°+138°=163° CA (absolute). Given a rotational speed n=4000, the curve 8 intersects at a crankshaft angle of approximately 121° CA. This results in a usable injection range IRu of only 146° for the fuel injection. These two examples show how in the dynamic approach according to various embodiments to the injection range the usable injection range IRu is reduced as the rotational speed increases.

The illustrated curves in the diagram in FIG. 5b concern the electrically calculated values for the start and the end of the injection. Furthermore, it is also necessary to take into account the fact that a further blank time, as a result of which the injection angle or the injection range is reduced further, occurs up to the response of the fuel injector or up to the closing of the fuel injector due to hydraulic delays. This delay time corresponds to the discharging signal edge of the last injection in the segment. The discharging signal edge must also lie within the injection range, with the result that the injection range is therefore reduced once more depending on the type of the fuel injector used. The delay time may be several 100 microseconds in a pump-nozzle injector. This limitation is illustrated in FIGS. 6a and 6b and will now be explained in more detail.

Figure 6A:
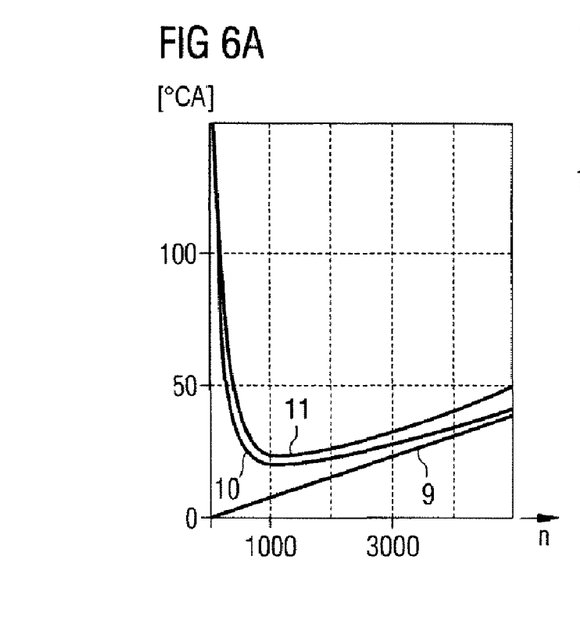

The diagram in FIG. 6a illustrates the curves 9 to 11. These curves correspond to the setup angle SA in different approaches. According to the known prior art, the curve 9 shows the profile of the setup angle as has already been illustrated in curve 5 in FIG. 5a.

Curve 10 shows the profile of the setup angle in the dynamic approach, in accordance with the curve 6 in FIG. 5a. If the discharging signal edge of the last injection pulse of a segment is then taken into account, a modified curve 11 is obtained. The curve 11 therefore also shows the influence of the discharging signal edge of the fuel injector on the time delay in the dynamic approach. This curve corresponds to the actual profile which includes not only electrical but also hydraulic and mechanical delay times.

Figure 6B:
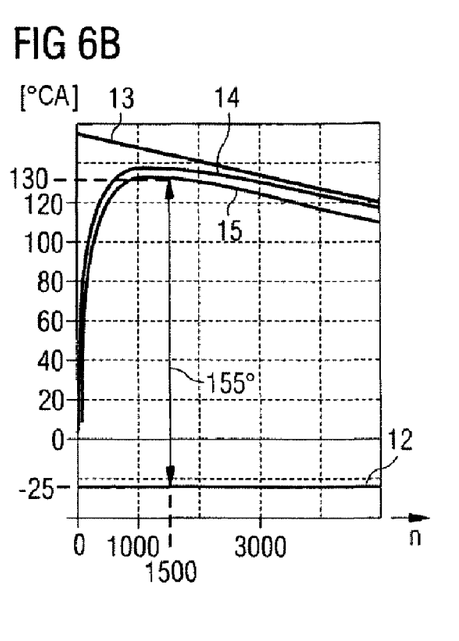

FIG. 6b illustrates the usable injection range IRu or the injection angle for the curves of the setup angle illustrated in 6a. The curve 12 shows in turn the profile of the start of injection SOI given a constant crankshaft angle −25° CA in the steady-state approach. The curve 13 shows the end of the last injection EOI in the steady-state approach.

In the dynamic approach, the curve 14 is obtained for the end of the injection EOI. The difference between the curve 12 and the curve 14 corresponds again to the behavior as has been explained with regard to FIG. 5b. The difference corresponds to the injection angle and therefore to the electrical usable injection range IRu of a segment.

The curve 15 is obtained if all the hydraulic delay times are included. The profile of the curve 15 is below that of the curve 14 and therefore reduces further the usable injection range. The rotational-speed-dependent usable injection range IRu is therefore obtained at −25° CA in relation to the start of the injection SOI between the curve 12 and the curve 15. When the curve 15 is considered, an end of the injection EOI is obtained, for example for a rotational speed n=1500, at a crankshaft angle of 130° CA. The usable injection range IRu for the segment is therefore 155°. If a retarded post-injection then occurs at an end of injection EOI at a crankshaft angle CA=150° for, for example, this rotational speed in a regeneration mode, the usable injection range is shifted by 20° in the rotational direction. The segment would therefore not start at −25° but rather now at −5°. The last injection, i.e. the end of the segment, is now at 150° CA.

It is to be noted that the injection strategy has to be taken into account in this approach. A retarded post-injection with an end of injection EOI=150° CA is required only for a particle filter in the regeneration mode. In the normal mode, i.e. in the usual state, the usable injection range starts by definition at −25° CA.

According to various embodiments, there is also provision that the switching over from the usual state to the regeneration mode occurs in a ramp shape, for example from the start of injection SOI=−25° CA up to SOI=5° CA. The process for the formation of the ramps is preferably tied to a ramp-shaped change in the injection angle for the individual injections. It is important here that during the ramp process and afterwards in the regeneration mode no injection angle occurs at which a pilot injection takes place before the start of injection SOI at a crankshaft angle 5° CA. If the segment window of the usable injection range IRu is shifted in the retarded direction, there are no resulting problems for further injection pulses. If, on the other hand, the segment range is conversely shifted forward in a ramp shape counter to the rotational direction, it would then be possible, under certain circumstances, for the ramp process of the segment window to result in interleaving with the last post-injection. There is therefore provision that at a high ramp speed a retarded post-injection for the ramp process is prohibited. Furthermore, the ramp process is carried out slowly and a sufficient angular reserve is provided after the post-injection so that the post-injection cannot be affected.

Figure 7:
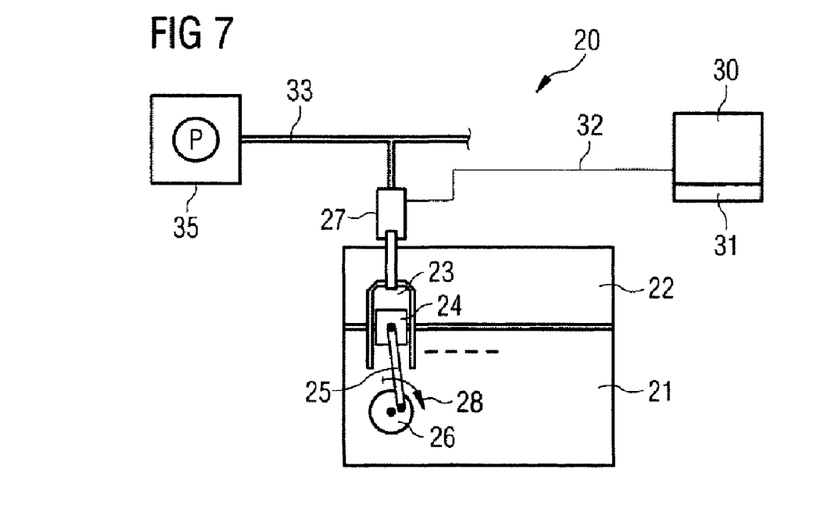
FIG. 7 is a schematic illustration of a block circuit diagram of a device according to various embodiments.

FIG. 7 shows, in a simplified embodiment, a block circuit diagram of a device 20 according to various embodiments. The device 20 is connected to an internal combustion engine 21 which has, for example, four cylinders 23 which can be closed off in a pressure-tight fashion by a cylinder head 22. In each cylinder 23, a combustion chamber and a piston 24 are arranged, which piston 24 drives a crankshaft 26 via a connecting rod 25. At least one injector 27, which is embodied as a pump-nozzle injector or as a common rail injector, is arranged in the cylinder head 22. The injector 27 is connected to a corresponding injection system at a pump 35 via a fuel line 33. Furthermore, the injector 27 is connected via electrical control lines 32 to a control device 30 which actuates an actuator of the injector 27 in order to inject fuel into the cylinder 23. The control device 30 has essentially a computer with a memory and/or a program 31. Furthermore, the control device 30 is embodied with the algorithm according to various embodiments with which the previously described control functions can be carried out. An already existing control device is preferably used as the control device 30, which is already designed to perform control and/or monitoring of engine functions. This control device is then extended by means of the program with the algorithm according to various embodiments.

What is claimed is:

1. A method for dynamically determining a usable injection range within a segment in which fuel can be injected into a cylinder of an internal combustion engine,
wherein the segment is a crankshaft angular segment,
wherein the segment is determined as a function of the number of cylinders of the internal combustion engine and from the number of banks, and
wherein a plurality of cylinders into which the fuel is sequentially injected are preferably assigned to one bank,
the method comprising the steps of:
determining a possible injection range for the segment,
arranging a usable injection range within which a fuel injection can be activated within the possible injection range,
furthermore, determining an angular spread for a setup angle within the possible injection range as a function of a rotational speed gradient,
making at least one of the possible injection range and the setup angle variable with respect to the relative position in relation to the crankshaft angle, and
determining the usable injection range as a function of at least one operating parameter of the internal combustion engine.

2. The method according to claim 1, wherein the setup angle is determined from the rotational speed of the engine and a setup time, wherein the setup time is at least the time period which a control device requires, in the case of a multiple-injection, to evaluate the last injection sequence from a preceding segment.

3. The method according to claim 1, wherein the setup angle is determined as a function of a worst case rotational speed gradient.

4. The method according to claim 1, wherein a latency time is determined for the determination of the setup angle, wherein the latency time is the time period which is required for the determination of an individual injection sequence up to the complete execution thereof.

5. The method according to claim 4, wherein a rotational speed gradient which corresponds to a worst case is used for the determination of the latency time.

6. The method according to claim 1, wherein at least one of the current rotational speed and a rotational speed gradient are used to determine the setup angle in the worst case.

7. The method according to claim 1, wherein, in the case of an incorrectly determined setup angle or if the control device is still within the setup time, a control pulse for the injection is shifted to the end of the setup time if the control pulse was too early.

8. The method according to claim 1, wherein the shifting of the usable injection range can be varied as a function of the capacity utilization factor of the control device.

9. The method according to claim 1, wherein, in the regeneration cycle for a diesel particle filter, the usable injection range is shifted to such an extent that a retarded post-injection can be carried out.

10. The method according to claim 1, wherein the shifting of the injection range is carried out in a ramp shape at a transition from a normal mode into a regeneration mode, and vice versa, wherein a torque neutrality at a steady-state working point is taken into account as a criterion.

11. A device for performing a method according to claim 1, comprising a control device of an injection system of an internal combustion engine, wherein the control device comprises a crankshaft angular segment within which a fuel injection into individual cylinders can be carried out, wherein
the control device has a program with an algorithm, and
the algorithm is designed to define a usable injection range for the fuel injection, and
the usable injection range can be determined, in terms of at least one of its angular spread and its relative position, at least as a function of a rotational speed gradient.

12. The device according to claim 11, wherein the control device is designed for a single-bank system of a four-cylinder diesel engine.

13. A system for dynamically determining a usable injection range within a segment in which fuel can be injected into a cylinder of an internal combustion engine, wherein the segment is a crankshaft angular segment, wherein the segment is determined as a function of the number of cylinders of the internal combustion engine and from the number of banks,
the system comprising a plurality of cylinders into which the fuel is sequentially injected, wherein the system is operable to:
determine a possible injection range for the segment,
arrange a usable injection range within which a fuel injection can be activated within the possible injection range,
determine an angular spread for a setup angle within the possible injection range as a function of a rotational speed gradient,
make at least one of the possible injection range and the setup angle variable with respect to the relative position in relation to the crankshaft angle, and
determine the usable injection range is determined as a function of at least one operating parameter of the internal combustion engine.

14. The system according to claim 13, wherein the setup angle is determined from the rotational speed of the engine and a setup time, wherein the setup time is at least the time period which a control device requires, in the case of a multiple-injection, to evaluate the last injection sequence from a preceding segment.

15. The system according to claim 13, wherein the setup angle is determined as a function of a worst case rotational speed gradient.

16. The system according to claim 13, wherein a latency time is determined for the determination of the setup angle, wherein the latency time is the time period which is required for the determination of an individual injection sequence up to the complete execution thereof.

17. The system according to claim 16, wherein a rotational speed gradient which corresponds to the worst case is used for the determination of the latency time.

18. The system according to claim 13, wherein at least one of the current rotational speed and a rotational speed gradient are used to determine the setup angle in the worst case.

19. The system according to claim 13, wherein, in the case of an incorrectly determined setup angle or if the control device is still within the setup time, a control pulse for the injection is shifted to the end of the setup time if the control pulse was too early.

20. The system according to claim 13, wherein the shifting of the usable injection range can be varied as a function of the capacity utilization factor of the control device.

21. A method for dynamically determining a usable injection range within a crankshaft angular segment in which fuel can be injected into a cylinder of an internal combustion engine, the method comprising:
   determining a possible injection range for the segment,
   arranging a usable injection range within which a fuel injection can be activated within the possible injection range,
   furthermore, determining an angular spread for a setup angle within the possible injection range as a function of a rotational speed gradient,
   making at least one of the possible injection range and the setup angle variable with respect to the relative position in relation to the crankshaft angle, and
   determining the usable injection range as a function of at least one operating parameter of the internal combustion engine.

22. A method for dynamically determining a usable injection range within a crankshaft angular segment in which fuel can be injected into a cylinder of an internal combustion engine, the method comprising:
   determining a possible injection range for the segment,
   arranging a usable injection range within which a fuel injection can be activated within the possible injection range,
   furthermore, determining an angular spread for a setup angle within the possible injection range,
   making at least one of the possible injection range and the setup angle variable with respect to the relative position in relation to the crankshaft angle,
   determining the usable injection range as a function of at least one operating parameter of the internal combustion engine, and
   shifting the usable injection range to an extent allowing a retarded post-injection in a regeneration cycle for a diesel particle filter.

23. A system for dynamically determining a usable injection range within a segment in which fuel can be injected into a cylinder of an internal combustion engine, wherein the segment is a crankshaft angular segment, wherein the segment is determined as a function of the number of cylinders of the internal combustion engine and from the number of banks,
   the system comprising a plurality of cylinders into which the fuel is sequentially injected, wherein the system is operable to:
   determine a possible injection range for the segment,
   arrange a usable injection range within which a fuel injection can be activated within the possible injection range,
   determine an angular spread for a setup angle within the possible injection range,
   make at least one of the possible injection range and the setup angle variable with respect to the relative position in relation to the crankshaft angle,
   determine the usable injection range is determined as a function of at least one operating parameter of the internal combustion engine, and
   shift the usable injection range to an extent allowing a retarded post-injection in a regeneration cycle for a diesel particle filter.

* * * * *